US006945131B2

(12) United States Patent
Dewert

(10) Patent No.: US 6,945,131 B2
(45) Date of Patent: Sep. 20, 2005

(54) FURNITURE DRIVE EMBODIED AS A DOUBLE DRIVE

(75) Inventor: Eckhardt Dewert, Zürich (CH)

(73) Assignees: Cimosys Limited (GB); Linak A/S (DK)

( * ) Notice: Subject to any disclaimer, the term of this patent is extended or adjusted under 35 U.S.C. 154(b) by 287 days.

(21) Appl. No.: 10/381,395

(22) PCT Filed: Sep. 19, 2001

(86) PCT No.: PCT/EP01/10815

§ 371 (c)(1),
(2), (4) Date: Mar. 21, 2003

(87) PCT Pub. No.: WO02/24034

PCT Pub. Date: Mar. 28, 2002

(65) Prior Publication Data

US 2003/0172756 A1 Sep. 18, 2003

(30) Foreign Application Priority Data

Sep. 21, 2000 (DE) ........................................ 100 46 752
Apr. 9, 2001 (DE) .................................... 201 06 189 U

(51) Int. Cl.[7] ............................................... F16H 21/16

(52) U.S. Cl. ................................ 74/25; 74/567; 74/45; 297/19

(58) Field of Search ............................ 74/567, 569, 49, 74/45, 44, 25, 89.23; 297/19, 46, DIG. 7

(56) References Cited

U.S. PATENT DOCUMENTS

| | | | | | |
|---|---|---|---|---|---|
| 3,897,695 | A | * | 8/1975 | Rostad | 74/516 |
| 3,972,081 | A | * | 8/1976 | Stern et al. | 5/618 |
| 4,411,035 | A | * | 10/1983 | Fenwick | 5/602 |
| 4,453,768 | A | * | 6/1984 | Cranford et al. | 297/440.1 |
| 5,074,000 | A | * | 12/1991 | Soltani et al. | 5/611 |
| 5,102,193 | A | * | 4/1992 | Goss et al. | 297/362.13 |
| 2001/0032362 | A1 | * | 10/2001 | Welling et al. | 5/600 |
| 2002/0002742 | A1 | * | 1/2002 | Osborne et al. | 5/600 |
| 2002/0066142 | A1 | * | 6/2002 | Osborne et al. | 5/600 |
| 2004/0128765 | A1 | * | 7/2004 | Osborne et al. | 5/600 |
| 2004/0177445 | A1 | * | 9/2004 | Osborne et al. | 5/600 |

FOREIGN PATENT DOCUMENTS

| | | |
|---|---|---|
| DE | 29605182 | 6/1995 |
| EP | 0 583 660 | 2/1994 |
| EP | 1 014 834 | 7/2000 |

* cited by examiner

*Primary Examiner*—David M. Fenstermacher
(74) *Attorney, Agent, or Firm*—R W Becker & Associates; R W Becker

(57) ABSTRACT

The invention relates to a furniture drive (2) for adjusting parts of a piece of furniture in relation to one another which is configured as a dual drive. Said drive comprises two drive units (4, 4'), every drive unit (4, 4') being provided with a linearly displaceable drive element that is functionally linked with a pivoted lever for pivoting said lever in the mounting position of the furniture drive. Said pivoted lever in turn is functionally linked with a part of the piece of furniture to be adjusted. The drive according to the invention is further characterized in that the linearly displaceable drive element or a support element (24) linked therewith is provided with a support surface (26) for supporting the pivoted lever (18) in a position remote from its pivot axis (16) in the mounting position of the furniture drive (2), which surface is inclined with respect to the axis of motion (29) of the drive element. The inventive furniture drive (2) is simple in design and therefore inexpensive, it is furthermore advantageous in that it is very compact.

22 Claims, 7 Drawing Sheets

FURNITURE DRIVE EMBODIED AS A DOUBLE DRIVE

BACKGROUND OF THE INVENTION

The invention relates to a furniture drive, embodied as a double drive, for moving parts of a piece of furniture relative to one another.

Such furniture drives are known in general and serve, for example, as adjustment drives for the movement or adjustment of parts of a lattice structure relative to one another. EP 0 372 032 B1 discloses a furniture drive, embodied as a double drive, for the adjustment of parts of a piece of furniture relative to one another, and is provided with two drive units. Each drive unit of the known furniture drive cooperates with a pivot lever that in the assembled position of the furniture drive is in functional connection with the part of the piece of furniture that is to be adjusted. With the known furniture drive, each drive unit has a linearly movable drive element that is in functional connection with the pivot lever for pivoting the latter. In this connection, the pivot lever is embodied as an angle lever upon which the linearly movable drive element, which is formed by a spindle nut that is disposed on an adjusting spindle, exerts a push for pivoting the pivot lever, and is thus in functional connection with the pivot lever.

DE 38 420 78 C2 discloses a furniture drive, embodied as a double drive, for the adjustment of parts of a piece of furniture relative to one another and is provided with two drive units, each drive unit being provided with a linearly movable drive element in the form of a spindle nut that is held on an adjusting spindle in such a way as to be protected against torsion and to be moved in an axial direction, and which is provided with a pivot lever for pivoting a part of a piece of furniture that the pivot lever is in functional connection with in the assembled position. For the cooperation with the pivot lever, each drive unit of the double drive of the known document is provided with a right-angled abutment member, the one holding leg of which that extends parallel to the linear movement axis of the spindle nut is connected with the spindle nut, and the other leg of which is perpendicular to the movement axis of the spindle nut and lightly acts upon that end of the pivot lever that is remote from the pivot axis.

DE 296 07 493 U1 discloses a furniture drive where formed on a spindle nut are two essentially horizontal abutment surfaces that are offset relative to one another in the direction of the movement axis, and that for the adjustment of a part of a piece of furniture, cooperate with a link lever that is provided with two lever arms that are angularly offset from one another.

The object of the invention is to provide a furniture drive, embodied as a double drive, that is simple in construction and hence economical to manufacture, and is also compact.

SUMMARY OF THE INVENTION

The basic concept of the inventive teaching is to provide on the linearly movable drive element, or an abutment member connected therewith, an abutment surface on which the pivot lever runs during the relative movement between the linearly movable drive element and the pivot lever, whereby the pivot lever cooperates with the abutment surface essentially in the manner of a cam drive, and is thereby pivoted.

In this way there results a straightforward and hence economical construction of the furniture drive with relatively few components.

A particular advantage of the inventive furniture drive is that especially when exploiting the operating principle of an inclined plane, the pivot lever can be shorter than is the case with the known furniture drive. In this way, the inventive furniture drive can have a relatively low overall height. This has the significant advantage that when combining, for example, a lattice structure with an inventive furniture drive, the thus-formed unit has an overall height that is not, or is only slightly, greater than the overall height of the lattice structure itself.

A further advantage of the inventive furniture drive is that it has a sturdy construction and is suitable for the application of great forces.

The inventive furniture drive is embodied as a dual or double drive. While basically maintaining the basic principle of operation, it is, however, also possible to embody the furniture drive as a single drive.

The component on which the abutment surface is embodied can have any desired shape. A further development provides that this component is essentially wedge-shaped or ramp-shaped. This embodiment is particularly straightforward and hence economical to manufacture, whereby the wedge or ramp shape forms the abutment surface that is inclined relative to the movement axis of the linearly movable drive element.

Another further development provides that the abutment surface is an essentially planar surface. However, while basically maintaining the basic principle of operation of an inclined plane, the abutment surface can also have a curved cross-section, as provided in another embodiment. By an appropriate selection of the cross section of the abutment surface one can select over a wide range about what pivot angle the pivot lever is pivoted if the linearly movable drive element is moved a certain stretch along its movement axis relative to the pivot lever.

In the embodiment having the essentially planar abutment surface, it is advantageous that the abutment surface form with the linear movement axis of the drive element an acute angle, especially an angle that is less than about 45°, whereas with the embodiment where the abutment surface has a curved cross section it is advantageous that an imaginary connecting line between the end points of the curved cross section form with the linear movement axis of the drive element an acute angle, especially an angle that is less than 45°. In this way, during the entire adjustment movement a particularly favorable articulation angle of the pivot lever results.

In the embodiment having the abutment surface with a curved cross section, the abutment surface can be convex or concave relative to the pivot lever, as provided in other embodiments.

The pivot lever can have any desired suitable shape, in particular being embodied as a single-arm lever that in the assembled position rests against the abutment surface with that end thereof that is remote from the pivot axis, i.e. eccentrically relative to the pivot axis. In this connection the pivot lever is generally not part of the inventive furniture drive, but rather is part of an adjustment fitting that is mounted on a lattice structure or the like. However, in principle the pivot lever can also be part of the inventive furniture drive. For the mounting of the furniture drive, it is then necessary to additionally produce, for example, a fixed connection between the pivot lever and the pivot shaft of the adjustment fitting. A further development provides that in the assembled position of the furniture drive the pivot lever rests against the abutment surface via a rotatably mounted roller. In this way, during the adjustment movement the friction between the pivot lever and the abutment surface is considerably reduced, thereby avoiding power loss due to friction. Furthermore, wearing-away of the abutment surface is considerably reduced.

The abutment surface can be formed directly on the linearly movable drive element or on an abutment member that is connected with the drive element in a suitable fashion. In this connection, the component on which the abutment surface is formed can be made of any desired suitable material. However, this component is expediently made of polymeric material. This embodiment is particularly straightforward and economical to produce.

Another advantageous further development provides that the component on which the abutment surface is formed is supported during the adjustment movement on a housing of the furniture drive or on a part connected therewith. In this way, the component of the reaction force of the pivot lever that extends perpendicular to the movement axis of the drive element is introduced into the housing. In this way there is avoided, for example with a spindle drive, that bending moments occur on the adjusting spindle that could lead to damage to the adjusting spindle.

A further development of the aforementioned embodiment provides that the abutment surface have a support portion against which the pivot lever is supported in one end position of the adjustment movement in such a way that forces introduced from the pivot lever into the component on which the abutment surface is formed act essentially entirely perpendicular to the movement axis of the drive element. In this way, in the end position of the adjustment movement, there occur practically no forces against the components of the furniture drive in the direction of the movement axis of the drive element and that try to move the component on which the abutment surface is formed back against the drive force of the furniture drive. As a result, in this end position the components of the furniture drive are nearly entirely relieved of forces that act in the direction of the movement axis of the drive element. This is particularly advantageous for the reason that in an end position that, for example, can correspond to a maximum pivot position of a part of a lattice structure that is pivoted with the inventive furniture drive, in general the greatest forces act upon the furniture drive and without relieving the components of the furniture drive can lead to damage of the furniture drive.

The linearly movable drive element can have any desired suitable configuration. One expedient further development provides that the linearly movable drive element be a spindle nut that is held on a rotatably drivable adjusting spindle in a manner protected against torsion and movable in an axial direction. Such spindle drives are available as simple and economical standard components, and have a sturdy construction and are suitable for the application of particularly great forces.

In a kinematic reversal of the aforementioned embodiment, the linearly movable drive element can also be an adjusting spindle that is movable in its axial direction and on which is disposed a stationary rotatably drivable spindle nut.

Another further development provides that the pivot lever, in the assembled position of the furniture drive, be fixedly connected with a rotatably mounted shaft that is in functional connection with a part of a piece of furniture that is to be moved or adjusted. In this connection, the pivot lever is generally not part of the furniture drive, but rather of an adjustment fitting, for example of a lattice structure. The pivot lever can, however, also be part of the furniture drive.

Other expedient further developments provide that each drive unit be provided with an electric motor and/or that the drive units of the double drive be accommodated in a common housing.

The pivot lever is expediently a single-arm lever.

A particularly advantageous further development of the inventive teaching provides that a part of the lever arm that is adjacent to the pivot axis form an angle with a part of the lever arm that is adjacent to the free end of the lever arm in such a way that the pivot lever have an angled-off or bent configuration. With this embodiment, the furniture drive can have a particularly low overall height. With the aforementioned embodiment, the angle can be an acute angle or approximately 90°, as provided by expedient further developments.

Another advantageous further development of the inventive teaching provides that the abutment surface be formed on that side of the abutment member that is remote from the pivot axis. With this embodiment, the forces that act upon the pivot lever during the adjustment movement try to pull the pivot shaft of the pivot lever into the housing of the furniture drive, so that an arresting or securing element, which can, for example, be embodied as a closing element and secures the pivot shaft against the housing, is to a large extent relieved of stress. In this way, damage to the securing element is reliably prevented.

In principle, the pivot lever can be subjected to pressure during the adjustment movement. Pursuant to a further development, however, the pivot lever is subjected to traction during the adjustment movement. In this way there is effected an introduction of the forces into the housing of the furniture drive essentially only in that region in which the pivot lever is disposed.

BRIEF DESCRIPTION OF THE DRAWINGS

The invention will be subsequently explained in greater detail with the aid of the accompanying drawings in which embodiments of an inventive furniture drive are illustrated. Shown are.

DESCRIPTION OF PREFERRED EMBODIMENTS

Figure 1:
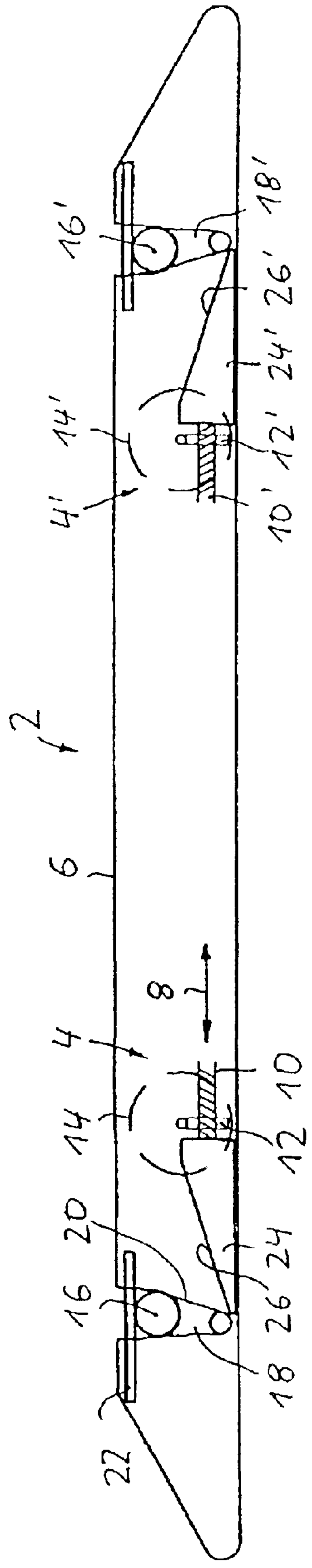
FIG. 1 in a very schematic side view, a first exemplary embodiment of an inventive furniture drive, whereby for reasons of illustration a portion of the housing in which the drive units are accommodated is omitted, FIGS. 2–4 in a very schematic illustration, which is enlarged relative to FIG. 1, a drive unit of the furniture drive of FIG. 1 in various adjustment or movement positions, FIG. 5 in a very schematic side view, an embodiment of a support device for a cushion of furniture for sitting and/or resting in the form of a lattice structure that is provided with the furniture drive of FIG. 1, in a first adjustment position, FIG. 6 the support device of FIG. 5 in a second adjustment position, and FIG. 7 a view from the left in FIG. 2 on the pivot lever and the abutment member, whereby the housing is illustrated sectioned, FIG. 8 in a schematic perspective illustration, a portion of a second embodiment of an inventive furniture drive, whereby for reasons of illustration a portion of the housing is omitted, FIG. 9 in a smaller scale relative to FIG. 8, the embodiment of FIG. 8 in a first adjustment position, and FIG. 10 in the same illustration as FIG. 9 the embodiment of FIG. 9 in a second adjustment position.

In the figures of the drawings, the same or corresponding components are provided with the same reference numerals.

FIG. 1 illustrates an embodiment of an inventive furniture drive 2 that in this embodiment is embodied as a double or dual drive and has two drive units 4, 4' that are accommodated in a common housing 6 and are held thereon by non-illustrated fastening means. In the following, only the drive unit 4 will be described in greater detail. The drive unit 4' has a corresponding construction, and its components are provided with reference numerals that correspond to the reference numerals of the components of the drive unit 4.

The drive unit 4 has a linearly movable drive element, which in this embodiment is formed by an adjusting spindle 10 that is movable back and forth in its axial direction in the direction of the double arrow 8, and which in this embodiment is embodied as a threaded spindle. On the adjusting spindle 10 is a stationary spindle nut 12 that is provided with an internal thread and which is rotatably drivable by means of an electric motor 14, which is indicated only schematically in the drawing, and a non-illustrated gear mechanism.

In the assembled position of the furniture drive 2, the adjusting spindle 10 is functionally connected with a pivot lever 18, which is pivotably mounted about a pivot axis 16, for the pivoting of the pivot lever. In this embodiment, the pivot lever 18 is not part of the furniture drive 2, but rather is part of an adjustment fitting of a support device, not illustrated in FIG. 1, for supporting a cushion of furniture for sitting and/or resting, for example of a lattice structure or grating. As illustrated in FIG. 1, the pivot lever 18 is accommodated in a recess 20 formed in the housing 6, and is arrested in the recess 20 by an arresting or securing element 22 in such a way that a pivoting of the pivot lever 18 is possible while at the same time it prevents the pivot lever 18 from coming out of the recess 20.

For the pivoting of the pivot lever 18, the drive unit 4 is provided with an abutment member 24 that is connected to that end of the adjusting spindle 10 that faces the pivot lever 18, whereby the connection between the adjusting spindle 10 and the abutment member 24 is able to withstand pushing and pulling. Pursuant to the invention, formed on the abutment member 24 is an abutment surface 26 that is inclined relative to the linear movement axis of the adjusting spindle 10 and that in this embodiment is essentially planar; during the course of the adjustment movement, the pivot lever 18 continually rests against the abutment surface and cooperates therewith in the manner of a cam drive. To form the inclined abutment surface 26, in this embodiment the upper side of the abutment member 24 that faces the pivot axis 16 is embodied in a ramp-shaped manner as an inclined plane, as can be seen from FIG. 1. In this embodiment, the abutment surface 26 is inclined at an acute angle of about 18° relative to the linear movement axis of the adjusting spindle 10. The inclination of the abutment surface 26 relative to the movement axis is, however, selectable over a wide range in conformity with the respective requirements.

The operation of the inventive furniture drive 2 will be explained subsequently with the aid of FIGS. 2 to 4.

Figure 2:
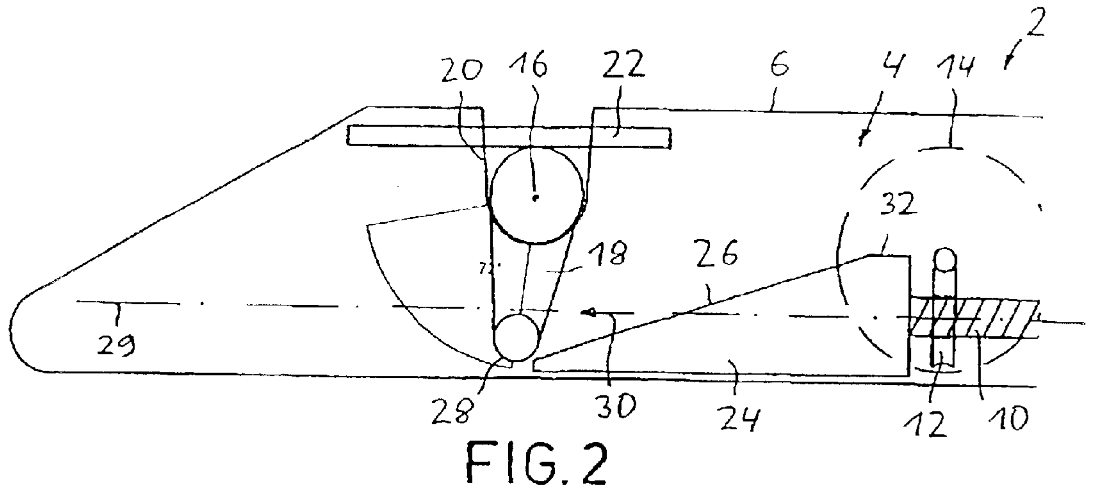

FIG. 2, in an enlarged illustration, shows the drive unit 4 in a first end position of the adjustment movement in which the pivot lever 18 does not yet rest against the abutment surface 26 of the abutment member 24. This first end position corresponds to a position in which the parts of a piece of furniture, which parts are movable or adjustable via the furniture drive 2, have not yet been adjusted or moved relative to one another.

For contact against the abutment surface 26, the pivot lever 18, which in this embodiment is embodied as a single-arm lever, is provided at its end, in other words eccentrically relative to the pivot axis 16, with a rotatably mounted roller 28, which will be described in greater detail subsequently with the aid of FIG. 7. The linear movement axis of the adjusting spindle 10 is symbolized in FIG. 2 by a dot-dashed line 29.

For pivoting the pivot lever 18, and hence for moving or adjusting a part of a piece of furniture that is in functional connection with the pivot lever 18 and is not illustrated in FIG. 2, the spindle nut 12 is rotatably driven by the electric motor 14 in such a way that the adjusting spindle 10 is moved to the left in FIG. 2 in the direction of an arrow 30. The control of the electric motor 14, and as well as of an electric motor 14' of the drive unit 4' that is not recognizable in FIG. 2, is effected by a control device, which is not illustrated in the drawing, by means of which the drive units 4, 4' can be controlled in common or separately from one another. The supply of power to the drive units 4, 4' is effected by a power supply device, which is also not illustrated in the drawing.

Figure 3:
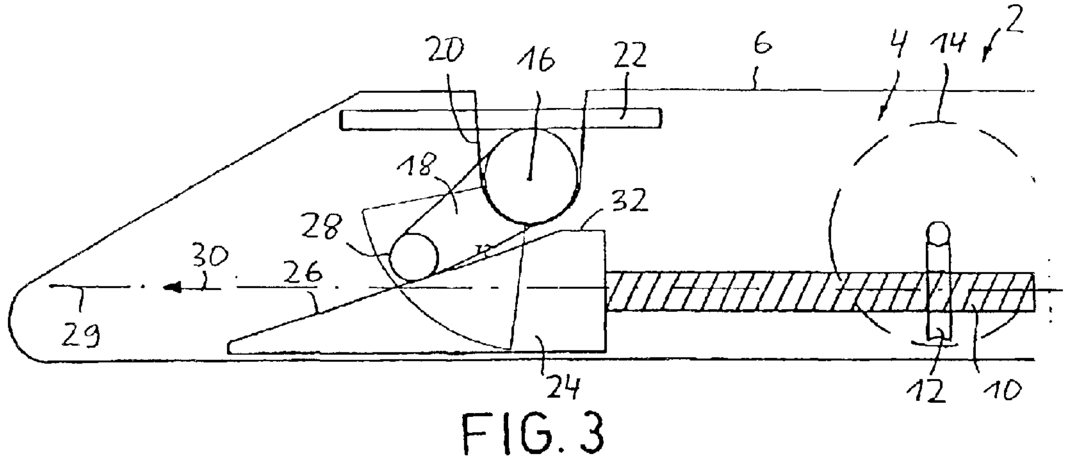

As the adjusting spindle 10, with the abutment member 24, moves toward the left in FIG. 2, the roller 28 of the pivot lever 18 first comes to rest against the abutment surface 26 and subsequently runs up upon the abutment surface 26 of the abutment member 24, which abutment surface is embodied as an inclined plane, whereby the pivot lever is pivoted, as is illustrated in FIG. 3. In this connection, the roller 28 of the pivot lever 18 rides or rolls on the abutment surface 26, so that only a slight friction occurs and a wearing of the abutment surface 26 is avoided.

During the pivoting, the pivot lever 18 moves a part of a piece of furniture that is not illustrated in FIGS. 1 to 4 and with which the pivot lever 18 is in functional connection in a suitable manner.

Figure 4:
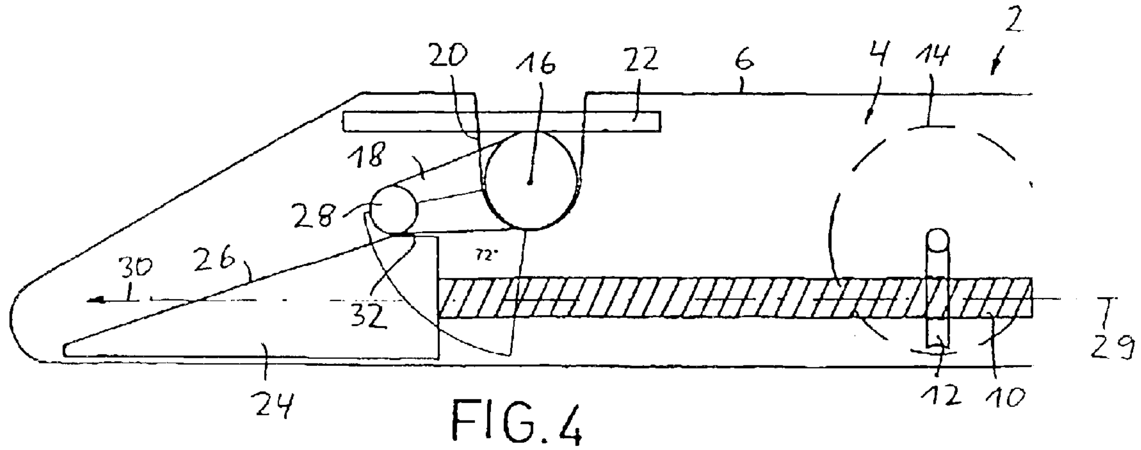

During the adjustment movement, the abutment member 24 is supported on a guide of the housing 6, which guide is not illustrated in FIGS. 2 to 4, so that a component of a reaction force of the pivot lever 18 that acts perpendicular to the movement axis 29 of the adjusting spindle 10 is absorbed by the housing 6 and is thus not introduced into the adjusting spindle 10.

FIG. 4 represents the other end position of the adjustment movement, which corresponds to the maximum adjustment or movement of the part of the non-illustrated piece of furniture that is to be adjusted. In this end position, the pivot lever 18 is supported on a planar support portion 32 of the abutment surface 26. The support portion is not inclined, and in the embodiment extends essentially horizontally. It is disposed in a plane that is essentially parallel to a support plane in which the abutment member 24 is supported on the guide means, on the housing 6, that is not illustrated in FIGS. 2 to 4. In this way, the reaction force that in this adjustment position is introduced from the pivot lever 18 into the abutment member 24 essentially has only a component that acts perpendicular to the movement axis 29, so that even where the part of the piece of furniture that is not illustrated in FIG. 4 is greatly stressed, practically no bending movements are introduced into the adjusting spindle 10. Thus, practically no forces act upon the components of the furniture drive 2 that try to move the abutment member 24 counter to the direction of the arrow 30. The forces introduced via the pivot lever 18 into the abutment member 24 are rather practically entirely introduced thereby into the housing 6.

Figure 5:
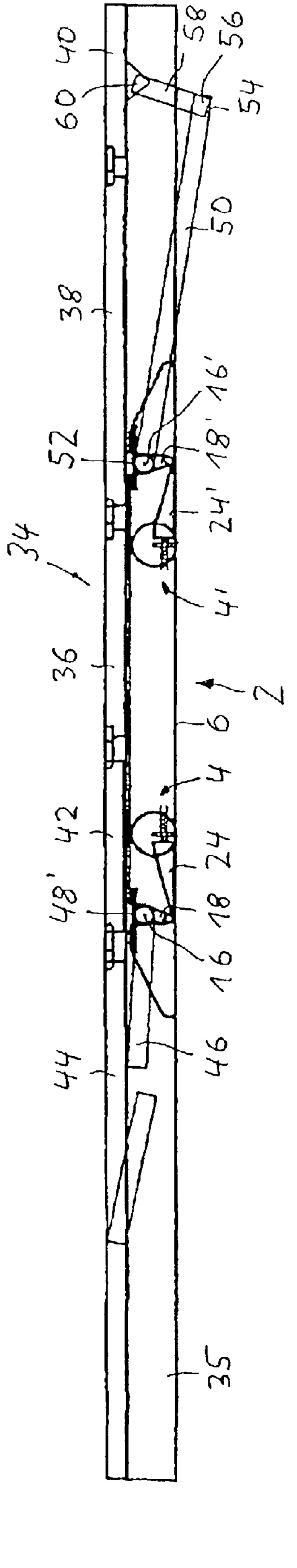

FIG. 5 illustrates a support device, which is provided with a furniture drive 2, for the support of a cushion of a piece of furniture for sitting and/or resting, whereby in this embodiment the support device is formed by a lattice structure 34. The lattice structure 34 has a frame 35 as well as a plurality of hingedly interconnected support elements. In detail, the lattice structure 34 is provided with a central support element 36, with one side of which an upper body support element 38 is hingedly connected and is pivotable about a horizontal pivot axis, with that side of the upper body support that is remote from the central support element 36 a head support element 40 is hingedly connected and is pivotable about a horizontal pivot axis. A leg or thigh support element 42 is hingedly connected with that side of the central support element 36 that is remote from the upper body support element 38 and is pivotable about a horizontal pivot axis, and a calf support element 44 is hingedly connected with that side of the leg support element that is remote from the central support element 36 and is pivotable about a horizontal pivot axis.

To adjust or move the leg support element 42 and the calf support element 44 relative to the central support element 36, a pivotable adjustment lever 46 is provided that is fixedly connected with a pivot shaft 48 with which also the pivot lever 18 is fixedly connected. The adjustment lever 46 is thus pivotable together with the pivot lever 18 about the pivot axis 16 of the latter.

To move or adjust the upper body support element 38 and the head support element 40 relative to the central support element 36, a further adjustment lever 50 is provided that is fixedly connected with a further pivot shaft 52 with which also the pivot lever 18' that is associated with the drive unit 4' is connected. The further adjustment lever 50 is thus pivotable together with the pivot lever 18' about the pivot axis 16' of the latter.

An end 56 of a link lever 58 is hingedly connected with that end 54 of the adjustment lever 50 that is remote from the pivot lever 18', and the other end 60 of the link lever is hingedly connected with the head support element 40.

Figure 6:
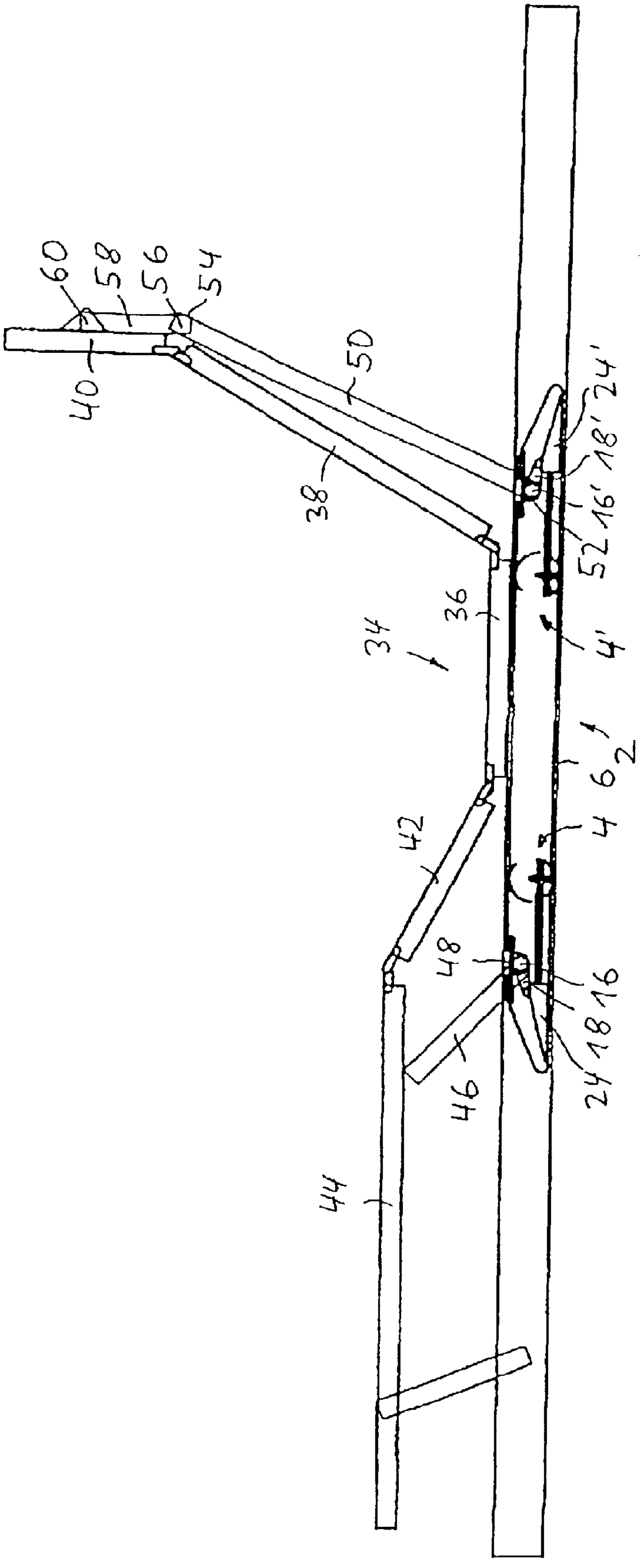

FIG. 5 shows the lattice structure 34 in a position in which the support elements 36, 38, 40, 42 are not moved relative to one another. To move or adjust the leg support element 42 and the calf support element 44 relative to the central support element 36 the electric motor 14 drives the spindle nut 12 in such a way that the adjusting spindle 10, together with the abutment member 24, are moved toward the left in FIG. 5, so that the pivot lever 18 runs up on the abutment surface 26 and is thereby pivoted about its pivot axis 16. In this connection, the adjustment lever 46 is pivoted in conformity therewith and moves the calf support element 44 together with the leg support element 42 until the end position of the adjustment movement in FIG. 6 is achieved.

In a corresponding manner, for adjusting or moving the upper body support element 38 and the head support element 40 relative to the central support element 36, the electric motor 14' of the drive unit 4' drives the spindle nut 12' in such a way that the adjusting spindle 10', together with the abutment member 24', are moved toward the right in FIG. 5. In so doing, the pivot lever 18' runs up on the abutment surface 26' of the abutment member 24' and pivots, so that also the further adjustment lever 50 is pivoted and the upper body support element 38 and the head support element 40 are moved until the end position of the adjustment movement illustrated in FIG. 6 is achieved.

For returning to the adjustment position illustrated in FIG. 5, the electric motor 14 drives the spindle nut 12 in such a way that the adjusting spindle 10, together with the abutment member 24, are moved toward the right in FIG. 5. The return of the upper body support element 38 and the head support element 40 is effected in a corresponding manner.

The inventive furniture drive 2 is straightforward and economical in construction as well as sturdy. Due to the exploitation of the operating principle of an inclined plane, the pivot levers 18, 18' can be relatively short, so that a compact construction having a low overall height results. As can be seen from FIGS. 5 and 6, due to this low overall height the inventive furniture drive 2 does not project beyond the frame 35 of the lattice structure 34.

To mount the furniture drive 2 on the lattice structure 34, the housing is placed from below onto the lattice structure 34, so that the pivot levers 18, 18' of the lattice structure engage into the recesses 20, 20' of the housing 6. The securing elements 22, 22' are subsequently mounted, thereby preventing the furniture drive 2 from coming off of the lattice structure 34.

Figure 7:
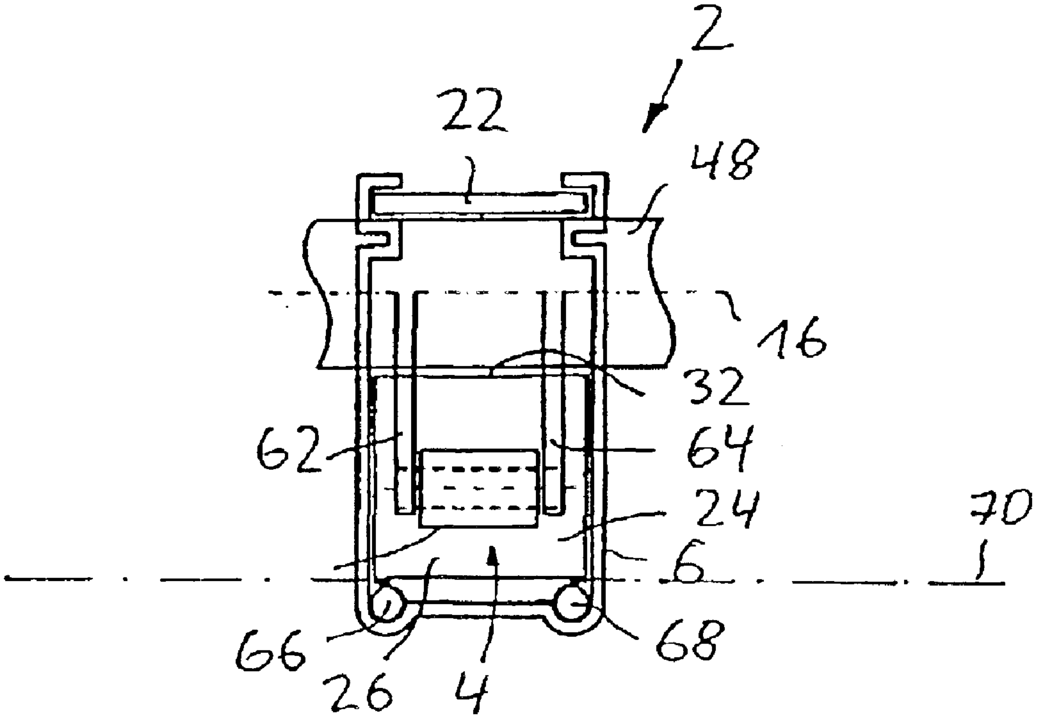

FIG. 7 schematically illustrates a view from the left in FIG. 2 upon the pivot lever 18 and the abutment member, whereby the housing 6 is illustrated in section. From this figure it can be seen that the pivot lever 18 is provided with two arms 62, 64 that are parallel to one another and between which the roller 28 is held in a rotatably mounted manner. The arms 62, 64 are fixedly connected with the pivot shaft 48. As can be further seen from FIG. 7, the securing element 22 has a plate-shaped configuration. It can also be seen from FIG. 7, that the abutment member 24 is supported on a rail-like guide means 66, 68 in a support plane that in FIG. 7 is symbolized by a dot-dash line 70. The support portion 32 of the abutment surface 26 is disposed in a plane that is parallel to the support plane 70.

Figure 8:
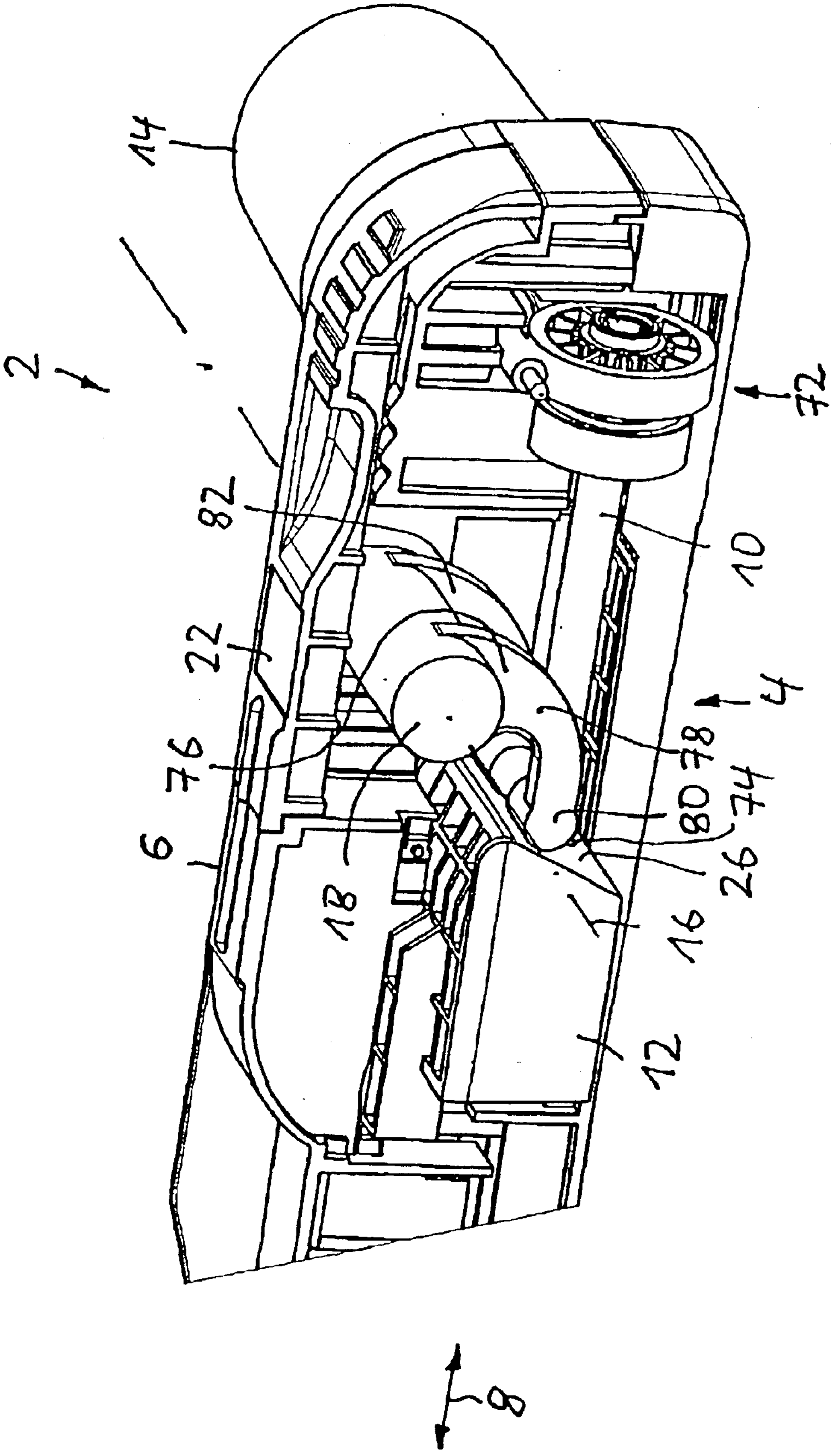

Illustrated in FIG. 8 is a second exemplary embodiment of an inventive furniture drive 2 that primarily differs from the embodiment of FIG. 1 in that the linearly movable drive element of the drive unit 4 is formed by the spindle nut 12, which is disposed on the adjusting spindle 10 so as to be protected against torsion and so as to be movable in the axial direction of the adjusting spindle. The adjusting spindle 10 is rotatably mounted and is in a rotatably drivable connection with the electric motor 14 via a gear mechanism 72.

In this embodiment, the spindle nut 10 forms the abutment member on which the abutment surface 26 is formed, in which an opening 74 is formed through which the adjusting spindle 10 extends. In contrast to the embodiment of FIG. 1, where the abutment surface 26 is formed on that side of the abutment member that faces the pivot axis 16, in the embodiment of FIG. 8 the abutment surface 26 is formed on that side that is remote from the pivot axis 16, in other words, on the underside of the abutment member.

In this embodiment, the pivot lever 18 is also a single-armed lever, whereby a part 76 of the lever arm 78 that is adjacent to the pivot axis 16 forms an angle with a part 80 of the lever arm 78 that is adjacent to the lever arm 78, whereby in this embodiment the angle is approximately 90° and is formed such that the lever arm 78 has a bent configuration.

As can be seen from FIG. 8, the pivot lever 18 is provided in addition to the lever arm 78 with a further lever arm 82 that is disposed parallel to the lever arm 78, whereby in the direction of the pivot axis 16, the adjusting spindle 10 is accommodated between the lever arms 72, 82. In principle, a single lever arm is adequate. However, due to the two lever arms 78, 82, which are disposed symmetrically relative to the longitudinal central plane of the pivot lever 18, there is ensured that the forces transferred from the spindle nut 12 to the pivot lever 18 are uniformly introduced into the pivot lever, thereby avoiding stressing or deformation.

Figure 9:
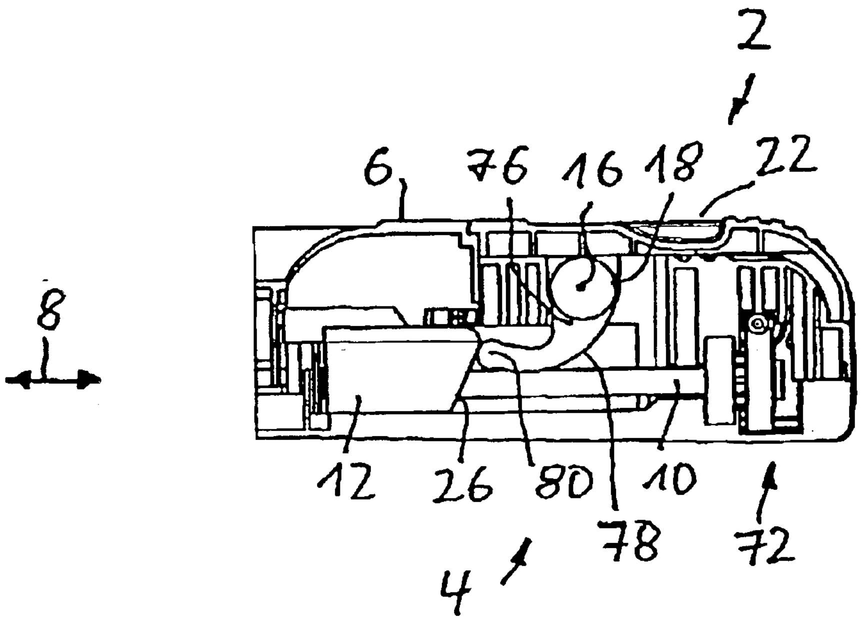
Figure 10:
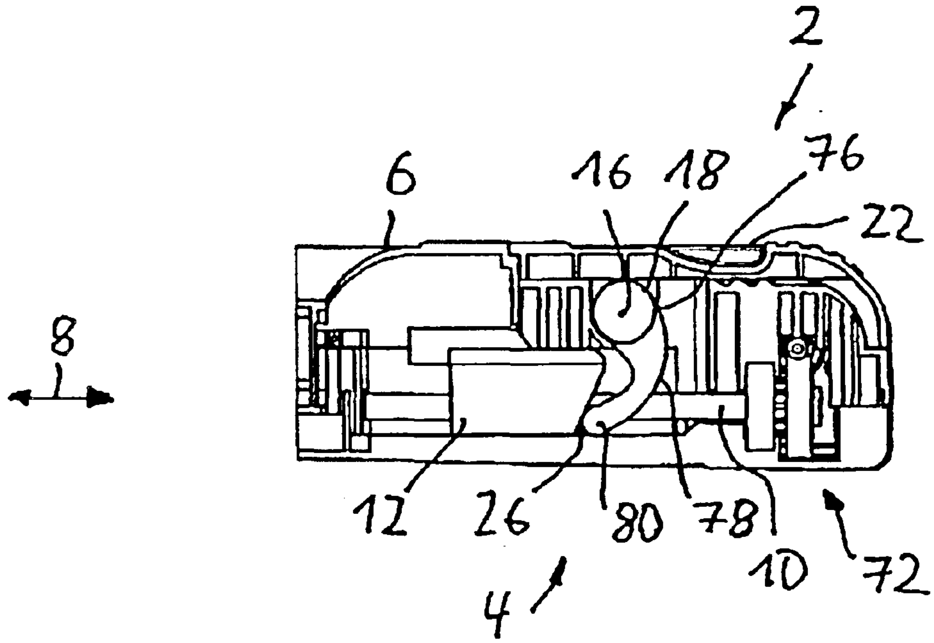

FIGS. 9 and 10 illustrate the drive unit 4 in the end positions of the adjustment movement, whereby it can be seen that in the embodiment of FIG. 8, during the adjustment movement the pivot lever 18 is subjected to traction, whereas in the embodiment of FIG. 1 it is subjected to pressure. In this way, during the adjustment movement the central portion of the housing 6, which is not illustrated in FIGS. 8 to 10 and is disposed between the drive units, absorbs no great forces, so that this portion of the housing 6 can be used, for example, for accommodating a control plate or board of the furniture drive.

Due to the configuration of the pivot lever 18 as a bent lever, as well as the arrangement of the abutment surface 26 on that side of the spindle nut 12 that is remote from the pivot axis 16, the embodiment of FIG. 8 has a particularly low overall height.

Furthermore, the forces that act upon the pivot lever 18 during the adjustment movement try to pull the pivot shaft of the pivot lever 18 into the housing 6. In this way, the security element 22, which can be embodied as a closing element, is to a large extent relieved of stress. Thus, damage to the securing element 22 is reliably prevented.

The specification incorporates by reference the disclosure of German priority document 100 46 752.0 filed Sep. 21, 2000, 201 06 189.9 filed Apr. 9, 2001 and PCT/EP01/10815 filed Sep. 19, 2001.

The resent invention is of course in no way restricted to the specific disclosure of the specification and drawings, but also encompasses any modifications within the scope of the appended claims.

What is claimed is:

1. A furniture drive, embodied as a double drive, for moving parts of a piece of furniture relative to one another, comprising:

two pivot levers, each of which, in an assembled position of said furniture drive, is in a functional connection with a furniture part that is to be moved;

two drive units, each of which is provided with a linearly movable drive element for pivoting said pivot levers; and a respective abutment member connected with each of said linearly movable drive elements, wherein each of said linearly movable drive elements, or said abutment members, are provided with an abutment surface that is inclined relative to a movement axis of said drive element, and wherein each of said abutment surfaces serves for supporting a pivot lever, in an assembled position of said furniture drive, at a location remote from a pivot axis of said pivot lever.

2. A furniture drive according to claim 1, wherein that component on which said abutment surface is formed is essentially wedge-shaped or ramp-shaped.

3. A furniture drive according to claim 1, wherein said abutment surface is an essentially planar surface.

4. A furniture drive according to claim 3, wherein said abutment surface forms an acute angle, especially an angle that is less than about 45°, with said movement axis of said drive element, which movement axis is linear.

5. A furniture drive according to claim 1, wherein said abutment surface has a curved cross-section.

6. A furniture drive according to claim 5, wherein an imaginary connecting line between end points of said curved cross-section of said abutment surface forms an acute angle, especially an angle that is less than about 45°, with said movement axis of said drive element, which movement axis is linear.

7. A furniture drive according to claim 6, wherein said abutment surface has a concave cross-section relative to said pivot lever.

8. A furniture drive according to claim 5, wherein said abutment surface has a convex cross-section relative to said pivot lever.

9. A furniture drive according to claim 1, wherein said pivot lever is provided with a rotatably mounted roller and wherein in said assembled position of said furniture drive, said pivot lever rests against said abutment surface via said roller.

10. A furniture drive according to claim 1, wherein that component on which said abutment surface is formed is made of polymeric material.

11. A furniture drive according to claim 1, wherein said component on which said abutment surface is formed rests during an adjustment movement against a housing of said furniture drive or against a part connected with said housing.

12. A furniture drive according to claim 11, wherein said abutment surface has an abutment portion against which, in an end position of an adjustment movement, said pivot lever is supported in such a way that forces introduced from the pivot lever into the component in which the abutment surface is formed act essentially perpendicular to said movement axis of said drive element.

13. A furniture drive according to claim 1, wherein said linearly movable drive element is a spindle nut that is held on a rotatably drivable adjusting spindle in a manner so as to be protected against torsion and to be movable in an axial direction.

14. A furniture drive according to claim 1, wherein said linearly movable drive element is an adjusting spindle that is movable in an axial direction thereof, and wherein a stationary, rotatably drivable spindle nut is disposed on said adjustment spindle.

15. A furniture drive according to claim 1, wherein in said assembled position of said furniture drive, said pivot lever is fixedly connected with a rotatably mounted shaft that is in functional connection with a part of a piece of furniture that is to be adjusted.

16. A furniture drive according to claim 1, wherein each of said drive units is provided with an electric motor.

17. A furniture drive according to claim 1, wherein said drive units of said double drive are accommodated in a common housing.

18. A furniture drive according to claim 1, wherein said pivot lever is a single-arm lever.

19. A furniture drive according to claim 1, wherein said pivot lever is provided with a lever arm, and wherein a first part of said lever arm that is adjacent to said pivot axis of said pivot lever forms with a second part of said lever arm that is adjacent to a free end of said lever arm an angle in such a way that said pivot lever has an angled-off or bent configuration.

20. A furniture drive according to claim 19, wherein said angle is an acute angle, or is approximately 90°.

21. A furniture drive according to claim 1, wherein said abutment surface is formed on that side of said abutment member that is remote from said pivot axis of said pivot lever.

22. A furniture drive according to claim 1, wherein said pivot lever is subjected to traction during an adjustment movement.

* * * * *